US012579521B2

(12) United States Patent
Nishimura et al.

(10) Patent No.: US 12,579,521 B2
(45) Date of Patent: Mar. 17, 2026

(54) GARBAGE COLLECTION TIME NOTIFICATION METHOD

(71) Applicants: TOYOTA JIDOSHA KABUSHIKI KAISHA, Toyota (JP); Nomura Research Institute, Ltd., Tokyo (JP)

(72) Inventors: Kazuya Nishimura, Anjo (JP); Naoki Uenoyama, Kasugai (JP); Keiko Nakano, Kawasaki (JP); Yohei Nakanishi, Nagoya (JP); Takahiro Matsumura, Tokyo (JP)

(73) Assignees: TOYOTA JIDOSHA KABUSHIKI KAISHA, Toyota (JP); Nomura Research Institute, Ltd., Tokyo (JP)

( * ) Notice: Subject to any disclaimer, the term of this patent is extended or adjusted under 35 U.S.C. 154(b) by 0 days.

(21) Appl. No.: 18/772,593

(22) Filed: Jul. 15, 2024

(65) Prior Publication Data

US 2025/0053935 A1 Feb. 13, 2025

(30) Foreign Application Priority Data

Aug. 7, 2023 (JP) ................................. 2023-128548

(51) Int. Cl.
*G06Q 10/30* (2023.01)
*G01C 21/36* (2006.01)
(52) U.S. Cl.
CPC ......... *G06Q 10/30* (2013.01); *G01C 21/3605* (2013.01)
(58) Field of Classification Search
CPC ...... G06Q 10/30; G06Q 10/047; G06Q 50/26; G01C 21/3605; G01C 21/343; B65F 3/00
See application file for complete search history.

(56) References Cited

U.S. PATENT DOCUMENTS

2020/0082354 A1* 3/2020 Kurani ................... G01K 1/026
2020/0109963 A1* 4/2020 Zass ...................... G05D 1/0094

FOREIGN PATENT DOCUMENTS

CN 116490446 A * 7/2023 ............. G06Q 10/30
JP 2022-170463 A 11/2022

OTHER PUBLICATIONS

"IoT-Integrated Deep Learning Model and SmartBin System for Real-Time Solid Waste Management"Dr. K. Saravanan, Dr Kapil Aggarwal, Karthick Raja M, N R Dakshina Murthy, Sireesha koneru, Archee Verma Apr. 11, 2023 (Year: 2023).*

(Continued)

*Primary Examiner* — Alexandru Cirnu
(74) *Attorney, Agent, or Firm* — Sughrue Mion, PLLC

(57) ABSTRACT

A vehicle transmits images in which garbage collection sites appear to a server. The server performs: identifying, among the plurality of images acquired from the vehicle, a yet-to-be-visited collection site image in which a yet-to-be-visited collection site appears that is a collection site by which a garbage truck has not yet passed in a travel route of the garbage truck; based on the identified yet-to-be-visited collection site image, calculating an estimated amount of garbage brought together at the yet-to-be-visited collection site; calculating an expected time of arrival at a collection site by which the garbage truck passes after the yet-to-be-visited collection site in the travel route such that the expected time of arrival at that collection site becomes later when the estimated garbage amount is large than when the estimated garbage amount is small; and notifying a user terminal of the expected time of arrival.

7 Claims, 3 Drawing Sheets

(56)  References Cited

OTHER PUBLICATIONS

"IoT-Integrated Deep Learning Model and SmartBin System for Real-Time Solid Waste Management"Dr. K. Saravanan, Dr Kapil Aggarwal, Karthick Raja M, N R Dakshina Murthy, Sireesha koneru, Archee Verma Apr. 11, 2023 (Year: 2023) (Year: 2023).*

* cited by examiner

FIG. 3

| NO. | REGION NAME | EXPECTED TIME OF ARRIVAL |
|---|---|---|
| 1 | XXX | ALREADY COLLECTED |
| 2 | XXX | HH:MM |
| 3 | XXX | HH:MM |

GARBAGE COLLECTION TIME NOTIFICATION METHOD

CROSS-REFERENCE TO RELATED APPLICATION

This application claims priority to Japanese Patent Application No. 2023-128548 filed on Aug. 7, 2023, incorporated herein by reference in its entirety.

BACKGROUND

1. Technical Field

The present disclosure relates to a garbage collection time notification method.

2. Description of Related Art

The garbage truck disclosed in Japanese Unexamined Patent Application Publication No. 2022-170463 (JP 2022-170463 A) visits a plurality of garbage collection sites in turn according to a preset travel route. The garbage truck collects garbage at each collection site.

SUMMARY

In a technology like JP 2022-170463 A in which a garbage truck visits collection sites in turn, a time at which the garbage truck arrives at each collection site can vary depending on the situation. Under such circumstances, a user who dumps garbage at a collection site cannot know the time of arrival of the garbage truck at the collection site that the user uses. Thus, it is possible that the garbage truck may arrive at the collection site at a time earlier than an anticipated time that is a time that the user has assumed. In this case, the garbage truck finishes collecting garbage at that collection site and departs for the next collection site earlier than the aforementioned anticipated time. As a result, the user cannot dump garbage.

A garbage collection time notification method to solve the above-described problem is performed by: a garbage truck including a receiver that acquires information on a current position of the receiver itself; an information processing device capable of communicating with the garbage truck, the information processing device storing position information on a plurality of collection sites at which the garbage truck collects garbage, and a travel route along which the garbage truck visits the plurality of collection sites one after another; and a vehicle capable of communicating with the information processing device, the vehicle including a camera that images surroundings and a receiver that acquires information on a current position of the receiver itself. The vehicle transmits images in which the collection sites appear among images captured by the camera to the information processing device along with imaging information showing an imaging position and an imaging date and time of each of the images. The information processing device performs: acquiring the images and the imaging information transmitted by the vehicle; acquiring information on a current position of the garbage truck; based on the information on the current position of the garbage truck and the imaging information, identifying, among the plurality of images acquired from the vehicle, a yet-to-be-visited collection site image in which a yet-to-be-visited collection site appears that is the collection site by which the garbage truck has not yet passed in the travel route; based on the identified yet-to-be-visited collection site image, calculating an estimated garbage amount that is an estimated value of an amount of garbage brought together at the yet-to-be-visited collection site; calculating an expected time of arrival at a predetermined collection site that is the collection site by which the garbage truck passes after the yet-to-be-visited collection site in the travel route such that the expected time of arrival at the predetermined collection site becomes later when the estimated garbage amount is large than when the estimated garbage amount is small; and outputting notification information for notifying the expected time of arrival at the predetermined collection site.

The above-described technical idea can provide a user of a garbage collection site with accurate information on an expected time of arrival of a garbage truck.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a view showing an example of a notification image.

DETAILED DESCRIPTION OF EMBODIMENTS

Overall Configuration

Figure 1:
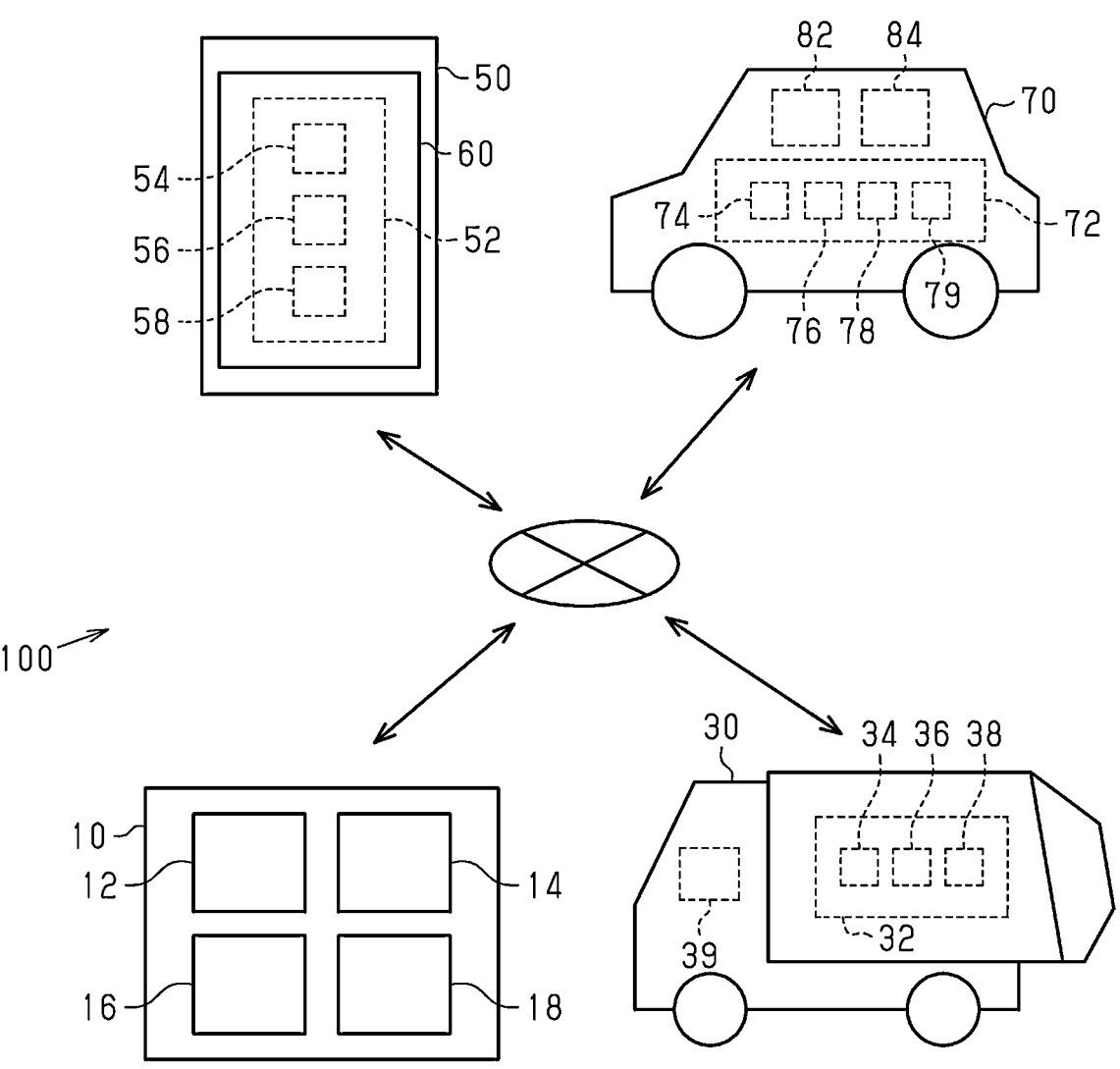
FIG. 1 is a schematic configuration diagram of a notification system.

One embodiment of a garbage collection time notification method will be described below with reference to the drawings. As shown in FIG. 1, a notification system 100 includes a plurality of vehicles 70, a plurality of user terminals 50, a plurality of garbage trucks 30, and a server 10. In FIG. 1, one vehicle 70 among the plurality of vehicles 70 is shown as a representative. The same applies to the user terminal 50 and the garbage truck 30.

Vehicle

The plurality of vehicles 70 is vehicles that are registered in the server 10 beforehand as vehicles that provide images of garbage collection sites. Each vehicle 70 includes a control device 72, a camera 82, and a receiver 84. The control device 72 includes a CPU 74, a memory 76, a communication module 78, and a real-time clock 79. The memory 76 has stored beforehand various programs in which processes to be executed by the CPU 74 are written. There are three types of the memory 76: an RAM, an ROM, and a non-volatile type that is electrically rewritable. In this embodiment, these three types are collectively referred to as a memory. The same applies to other control devices and the server 10 to be described later. The communication module 78 is a communication circuit for wirelessly communicating with an outside through an external communication line network. The communication module 78 transmits information to the outside upon receiving a command from the CPU 74 or acquires information from the outside and transfers the information to the CPU 74. The real-time clock 79 is a circuit that generates information on a date and time.

The camera 82 is, for example, an imaging device constituting a drive recorder. The camera 82 images surroundings of the vehicle 70 with the outside of the vehicle 70 as a target. The camera 82 generates images thereby obtained.

The camera 82 images the surroundings of the vehicle 70 and generates images repeatedly during travel of the vehicle 70.

The receiver 84 acquires information on a current position of the receiver 84 itself from a global positioning satellite. The information on the current position is specifically coordinates of the current position indicated by a latitude and a longitude. The current position of the receiver 84 corresponds to the current position of the vehicle 70.

The CPU 74 repeatedly acquires the current position of the vehicle 70 from the receiver 84. When the current position of the vehicle 70 matches one of a plurality of registered points, i.e., when the vehicle 70 has passed by a registered point, the CPU 74 performs a data generation process. The registered points are collection sites that are targets of which images are to be provided. The memory 76 has stored position coordinates of the plurality of registered points beforehand. In the data generation process, the CPU 74 acquires, from the camera 82, an image that the camera 82 has captured when the vehicle 70 has passed by a registered point. The CPU 74 handles this image as an image in which a collection site appears. Thus, the CPU 74 acquires, from the camera 82, an image in which a collection site appears among images that the camera 82 are capturing as needed. Then, the CPU 74 generates a set of data in which the acquired image is provided with imaging information and a vehicle number as data-to-be-provided. The imaging information is an imaging position and an imaging date and time of the acquired image. The CPU 74 handles the position coordinates of the registered point that has triggered execution of the data generation process as the imaging position of the acquired image. The CPU 74 handles the date and time at which the vehicle 70 has passed by the registered point that has triggered execution of the data generation process as the imaging date and time of the acquired image. The vehicle number is an individual identification number allocated to each vehicle 70. When the CPU 74 has generated the data-to-be-provided, the CPU 74 transmits the generated data-to-be-provided to the server 10.

User Terminal

The plurality of user terminals 50 is mobile terminals owned by respective users who dump garbage at the collection sites. Each user terminal 50 is, for example, a smartphone or a tablet terminal. Each user terminal 50 includes a control device 52 and a user interface 60. The control device 52 includes a CPU 54, a memory 56, and a communication module 58. The memory 56 has stored beforehand various programs in which processes to be executed by the CPU 54 are written. Functions of the communication module 58 are the same as the functions described for the control device 72 of the vehicle 70. The user interface 60 includes, for example, a touch-panel display screen. Thus, when a user performs an input operation on the user interface 60, information according to the input operation is input into the control device 52.

The CPU 54 can execute a display process according to the user's operation. The display process is a process for displaying an expected time of arrival table of the garbage truck 30 on the user interface 60. Specifically, when execution of the display process is ordered, the CPU 54 outputs, to the server 10, a request for transmission of notification information relating to the expected time of arrival of the garbage truck 30. When the CPU 54 acquires the notification information from the server 10 as a response to this transmission request, the CPU 54 displays an image according to the acquired notification information on the user interface 60.

Garbage Truck

The plurality of garbage trucks 30 is registered in the server 10 beforehand as vehicles that are targets of which the positions are to be tracked by the server 10. Each garbage truck 30 includes a control device 32 and a receiver 39. The control device 32 includes a CPU 34, a memory 36, and a communication module 38. The memory 36 has stored beforehand various programs in which processes to be executed by the CPU 34 are written. Functions of the communication module 38 are the same as the functions described for the control device 72 of the vehicle 70. The receiver 39 acquires information on a current position of the receiver 39 itself from a global positioning satellite. The current position of the receiver 39 corresponds to the current position of the garbage truck 30. The CPU 34 repeatedly transmits a set of data in which the current position acquired by the receiver 39 is provided with a truck number as position data to the server 10. The truck number is an individual identification number allocated to each garbage truck 30.

As is commonly known, the garbage truck 30 is a special-purpose vehicle that is used to collect garbage. Being operated by a worker, the garbage truck 30 visits a plurality of collection sites one after another. The garbage truck 30 collects garbage at each collection site through work performed by the worker.

Server

The server 10 is an information processing device owned by a local government or a business operator entrusted by a local government. The server 10 includes a CPU 12, a memory 14, a communication module 16, and a real-time clock 18. The memory 14 has stored beforehand various programs in which processes to be executed by the CPU 12 are written. Functions of the communication module 16 and the real-time clock 18 are the same as the functions described for the control device 72 of the vehicle 70.

The memory 14 has stored beforehand the truck numbers of the plurality of garbage trucks 30 that is targets of which the positions are to be tracked. The CPU 12 receives position data transmitted from these garbage trucks 30 at all times.

The memory 14 has stored beforehand the vehicle numbers of the plurality of vehicles 70 that provides images of the garbage collection sites. The CPU 12 receives data-to-be-provided that is transmitted from the plurality of vehicles 70 at all times. When the CPU 12 acquires data-to-be-provided from the vehicles 70, the CPU 12 makes the memory 14 continue to store the acquired data-to-be-provided only for the day on which the data-to-be-provided has been acquired.

The memory 14 has stored map data beforehand. The map data has a plurality of nodes and a plurality of links. Each node represents position coordinates indicated by a latitude and a longitude. Each node is provided with a plurality of pieces of incidental information. One example of the incidental information is a type of the node, such as an intersection or a branch point. Each link is specified as a line segment connecting adjacent nodes. Each link represents a road. Each link is provided with a plurality of pieces of incidental information. One example of the incidental information is a type of the road, such as a national route or a prefectural route.

The map data includes position information on the plurality of collection sites. Specifically, in the map data, each node corresponding to a collection site is provided with, as incidental information, an identification value indicating that the node is a collection site, a collection site number that is allocated to each collection site, and an identification value indicating a region name of each collection site. The collection site number corresponds to a number in order in which one garbage truck 30 collects garbage. Specifically, a collection site that the garbage truck 30 visits first is allocated "1" as the collection site number. The collection site number of the collection site becomes larger according to the number in the order in which the garbage truck 30 visits the collection sites. A collection site that the garbage truck 30 visits last is provided with an identification value indicating that the collection site is the last collection site. The collection site numbers are specified for each collection area. The collection area is an area including a plurality of collection sites that one garbage truck 30 visits on a certain day of the week.

The map data includes information on a travel route along which the garbage truck 30 visits the plurality of collection sites one after another. Specifically, in the map data, links corresponding to the travel route are provided with, as incidental information, an identification value indicating that the links are roads through which the garbage truck 30 passes, and a route number indicating a number of the travel route. The route number can also be called an identification number indicating the collection area. When one collection area is looked at, the travel route connects nodes of collection sites present in the collection area in order of increasing collection site number, from a base of the garbage truck 30 as a starting point. A final point in the travel route is the base of the garbage truck 30. In this embodiment, the garbage truck 30 in charge is allocated beforehand for each collection area, i.e., each travel route. The route number reflects the truck number of the garbage truck 30 in charge.

Notification Process

The CPU 12 can execute a notification process. The notification process is a process for notifying each user terminal 50 of an expected time of arrival of the garbage truck 30 at each collection site. The CPU 12 performs the notification process for each collection area. In the following, contents of the notification process will be described with one collection area as a target. When a day of the week for garbage collection in the target collection area comes, the CPU 12 identifies the garbage truck 30 that should travel around the collection area based on the route number included in the map data. Subsequently, the CPU 12 repeatedly acquires information on the current position from that garbage truck 30. When the garbage truck 30 departs from the base, the CPU 12 starts the notification process. The CPU 12 repeats the notification process until the garbage truck 30 reaches the last collection site in the collection area. The CPU 12 starts the notification process at intervals of a predetermined time, for example, ten minutes. When the day of garbage collection comes, the CPU 12 performs the following before executing the first notification process. First, the CPU 12 identifies the travel route that is allocated the route number corresponding to the target collection area from the map data. When the CPU 12 has identified the travel route, the CPU 12 identifies an advancing direction of the garbage truck 30 on the travel route with reference to the collection site numbers of the garbage collection sites. Thereafter, the CPU 12 identifies the collection site number of the collection site that is the last but one collection site on the travel route as an analysis end number. The CPU 12 uses these identified pieces of information for each time of the notification process. While point-by-point description will be omitted, the CPU 12 stores pieces of information that the CPU 12 has identified or generated in the memory 14 as necessary.

Figure 2:
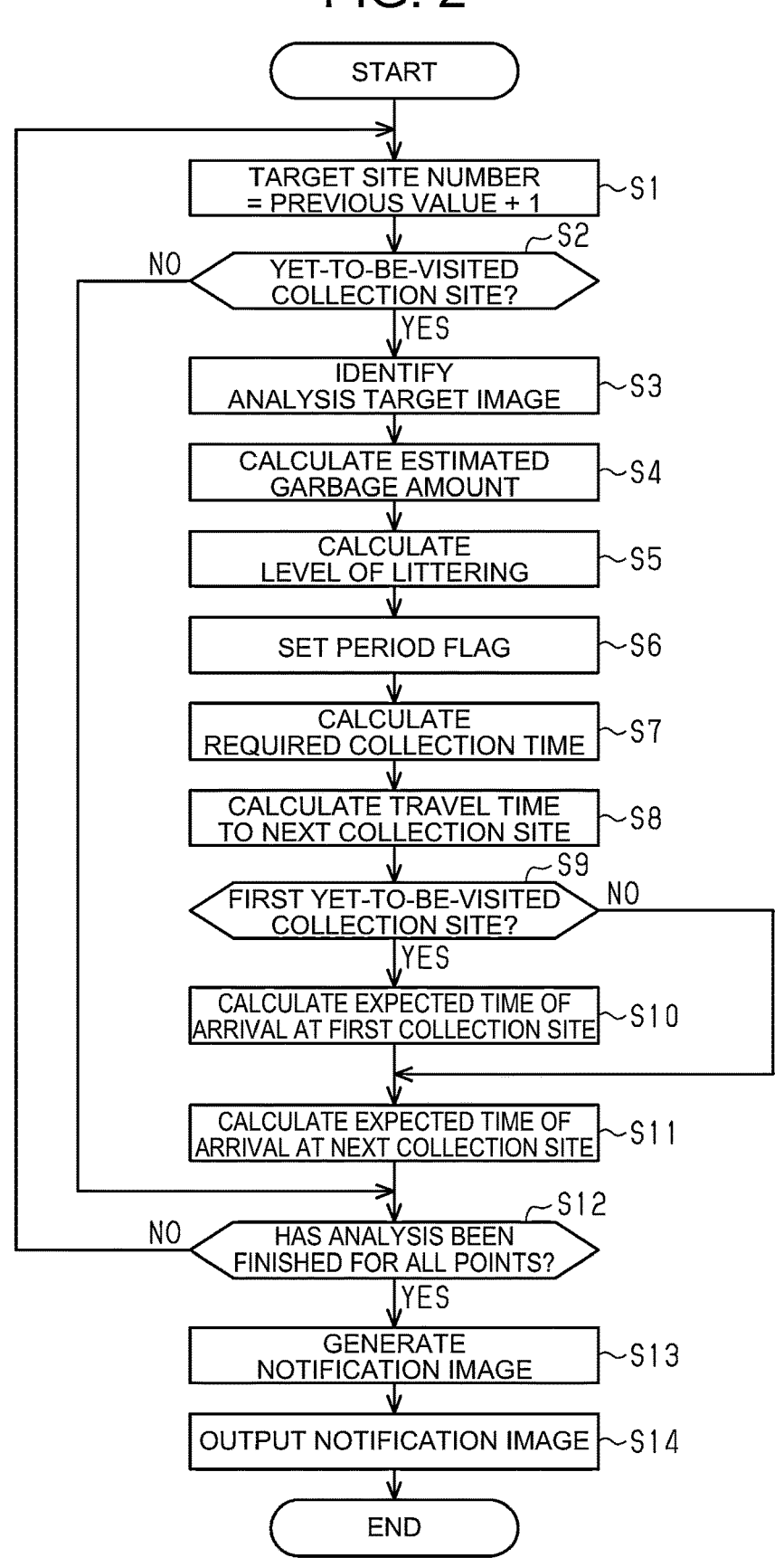
FIG. 2 is a flowchart showing a processing procedure of a notification process.

As shown in FIG. 2, when the CPU 12 has started the notification process, the CPU 12 resets the target site number to zero before executing the process of step S1. In step S1, the CPU 12 updates the target site number. Specifically, the CPU 12 adds "1" to a previous value that is a target site number set at a current point in time. Then, the CPU 12 uses the obtained value as a new target site number. Thereafter, the CPU 12 moves to the process of step S2.

In step S2, the CPU 12 determines whether the collection site corresponding to the target site number is a yet-to-be-visited collection site. A yet-to-be-visited collection site is a collection site by which the garbage truck 30 has not yet passed in the travel route. As the specific process of step S2, the CPU 12 first identifies the collection site corresponding to the target site number in the travel route that has been identified in advance. Then, the CPU 12 compares the position of the identified collection site and the current position of the garbage truck 30 in the travel route. When the current position of the garbage truck 30 is a position farther advanced than the collection site corresponding to the target site number in the travel route, the CPU 12 determines that the collection site corresponding to the target site number is not a yet-to-be-visited collection site (step S2: NO). In this case, the CPU 12 moves to the process of step S12. Also when the current position of the garbage truck 30 matches the collection site corresponding to the target site number, the CPU 12 determines "NO" in step S2. Then, the CPU 12 moves to the process of step S12. The process of step S12 will be described later.

On the other hand, in step S2, when the current position of the garbage truck 30 is a position before the collection site corresponding to the target site number in the travel route, the CPU 12 determines that the collection site corresponding to the target site number is a yet-to-be-visited collection site (step S2: YES). In this case, the CPU 12 moves to the process of step S3. Hereinafter, the yet-to-be-visited collection site corresponding to the target site number will be referred to as an analysis target site.

In step S3, the CPU 12 identifies an analysis target image that is an image in which the analysis target site appears among images included in a plurality of pieces of data-to-be-provided that is stored in the memory 14. The analysis target image corresponds to a yet-to-be-visited collection site image that is an image in which a yet-to-be-visited collection site appears. The CPU 12 identifies the analysis target image as follows. First, for each piece of data-to-be-provided, the CPU 12 refers to the imaging position among the pieces of imaging information accompanying the image. The CPU 12 identifies, as a candidate image, an image of which the imaging position matches the position coordinates of the analysis target site known from the map data. Here, in some cases there is a plurality of candidate images, and in other cases there is only one candidate image. When there is a plurality of candidate images, the CPU 12 refers to the imaging dates and times accompanying the candidate images. The CPU 12 identifies, as the analysis target image, an image of which the imaging date and time is the latest of the plurality of candidate images. On the other hand, when there is only one candidate image, the CPU 12 identifies that candidate image directly as the analysis target image. When the CPU 12 has identified the analysis target image, the CPU 12 moves to the process of step S4. Thus, through the process of step S3 and the process of step S2 described above, the CPU 12 identifies the analysis target image in which the analysis target site appears based on the current position of the garbage truck 30 and the imaging position and the imaging date and time included in each piece of data-to-be-provided. Depending on how much of the data-to-be-provided is collected, it is possible that there is no analysis target image. In this case, the CPU 12 skips step S4, step S5, and step S6 to be described later. In step S7, the CPU 12 sets, as a required collection time to be described later, a standard collection time that is specified beforehand. The memory 14 has stored the standard collection time beforehand.

In step S4, the CPU 12 calculates an estimated garbage amount based on the analysis target image identified in step S3. The estimated garbage amount is an estimated value of an amount of garbage brought together at the yet-to-be-visited collection site. The CPU 12 calculates the estimated garbage amount using a first model that has been stored in the memory 14 beforehand. The first model is a learned model that has been learned by supervised learning before the first model has been installed in the server 10. The first model receives a yet-to-be-visited collection site image as an input and outputs the estimated garbage amount. By inputting the analysis target image into this first model, the CPU 12 calculates the estimated garbage amount at the analysis target site.

Here, data in which a yet-to-be-visited collection site image of a certain amount of garbage is associated with that certain amount of garbage as correct-answer information will be referred to as first teacher data. The first model has been learned using such first teacher data. Specifically, to learn the first model, innumerable pieces of first teacher data generated from various yet-to-be-visited collection site images of different amounts of garbage are prepared beforehand. Then, parameters for the first model are repeatedly adjusted such that the output of the first model when the first model is executed using each first teacher data as a target approaches the correct-answer information included in the first teacher data. In this way, the first model is learned. The amount of garbage of the correct-answer information is specified as a number of garbage bags. Thus, the amount of garbage becomes larger as the number of garbage bags becomes larger.

When the CPU 12 has calculated the estimated garbage amount in step S4, the CPU 12 moves to the process of step S5. In step S5, the CPU 12 calculates a level of littering of garbage based on the analysis target image identified in step S3. Here, garbage bags brought together at a collection site can be messed up by, for example, a wild animal. As a result, a garbage bag can tear and garbage inside it can be thrown out. In this case, the collection site is in a state of being littered with the garbage thrown out of the garbage bag. The level of littering represents the degree of littering of garbage in a state of being thrown out of garbage bags as rated by multiple levels. The CPU 12 calculates the level of littering using a second model that has been stored in the memory 14 beforehand. The second model is a learned model that has been learned by supervised learning before the second model has been installed in the server 10. The second model receives a yet-to-be-visited collection site image as an input and outputs the level of littering. By inputting the analysis target image into this second model, the CPU 12 calculates the level of littering at the analysis target site.

Here, data in which a yet-to-be-visited collection site image of a certain level of littering is associated with that certain level of littering as correct-answer information will be referred to as second teacher data. The second model has been learned using such second teacher data. Specifically, to learn the second model, innumerable pieces of second teacher data generated from various yet-to-be-visited collection site images of different levels of littering are prepared beforehand. Then, parameters for the second model are repeatedly adjusted such that the output of the second model when the second model is executed using each second teacher data as a target approaches the correct-answer information included in the second teacher data. In this way, the second model is learned. The level of littering of the correct-answer information becomes higher as the number of pieces of garbage thrown out of garbage bags increases.

When the CPU 12 has calculated the level of littering in step S5, the CPU 12 moves to the process of step S6. In step S6, the CPU 12 sets a period flag. The period flag is a flag for separating a period in which the amount of garbage is particularly large at the analysis target site and other periods. As a precondition for the CPU 12 to perform step S6, the memory 14 has stored a period division list for each collection area beforehand. Each of 24 periods into which one year is divided on a half-month basis will be referred to as an individual period. In one period division list, the following contents are specified in association with each of the plurality of collection site numbers included in the target collection area. In one period division list, individual periods corresponding to a first period and individual periods corresponding to a second period are specified for each collection site. The first period is a period in which the amount of garbage brought together at the target collection site for one time of garbage collection becomes equal to or larger than a set value. The second period is a period in which the amount of garbage brought together at the target collection site for one time of garbage collection becomes smaller than the set value. As described above, the amount of garbage is the number of garbage bags. The set value is specified beforehand as, for example, two times a standard garbage amount. The standard garbage amount is, for example, an annual average value of the amount of garbage in terms of various collection areas as a whole.

As the specific process of step S6, the CPU 12 first identifies the period division list for the target collection area from among the period division lists for the respective collection areas. Each period division list is provided with the above-described route number. The CPU 12 identifies the period division list for the target collection area based on this route number. When the CPU 12 has identified the period division list, the CPU 12 identifies the collection site corresponding to the collection site number of the analysis target site from among the plurality of collection sites specified in the period division list. Then, the CPU 12 refers to the first period and the second period relating to this collection site. The CPU 12 compares these periods and the imaging date and time accompanying the analysis target image identified in step S3, i.e., the imaging date and time of the yet-to-be-visited collection site image based on which the estimated garbage amount has been calculated in step S4. The CPU 12 determines whether the imaging date and time of the analysis target image is a date and time within the first period or a date and time within the second period. When the imaging date and time of the analysis target image is a date and time within the first period, the CPU 12 sets the period flag to "1." On the other hand, when the imaging date and time is a date and time within the second period, the CPU 12 sets the period flag to "2." Thereafter, the CPU 12 moves to the process of step S7.

In step S7, the CPU 12 calculates the required collection time. The required collection time is a time required for the worker to collect the garbage into the garbage truck 30 at the analysis target site. The CPU 12 calculates the required collection time based on the estimated garbage amount calculated in step S4, the level of littering calculated in step S5, and the period flag calculated in step S6. When the level of littering is the same and also the period flag is the same, the CPU 12 calculates the required collection time such that the required collection time becomes longer as the estimated garbage amount becomes larger. When the estimated garbage amount is the same and also the period flag is the same, the CPU 12 calculates the required collection time such that the required collection time becomes longer as the level of littering becomes higher. When the estimated garbage amount is the same and also the level of littering is the same, the CPU 12 calculates the required collection time such that the required collection time becomes longer when the period flag is "1" than when the period flag is "2." The CPU 12 calculates the required collection time, for example, based on the following relational expression. The CPU 12 calculates, as the required collection time, a sum of a value obtained by multiplying the estimated garbage amount by a first coefficient, a value obtained by multiplying the level of littering by a second coefficient, and a correction value. When the period flag is "1," the CPU 12 sets the correction value to a positive value specified beforehand. The memory 14 has stored the correction value beforehand. When the period flag is "2," the CPU 12 sets the correction value to zero. The first coefficient is a coefficient for converting the estimated garbage amount into the garbage collection time. The second coefficient is a coefficient for converting the level of littering into the garbage collection time. When the CPU 12 has calculated the required collection time, the CPU 12 moves to the process of step S8.

In step S8, the CPU 12 calculates a travel time from the analysis target site to the next collection site. The next collection site is a yet-to-be-visited collection site that the garbage truck 30 visits next to the analysis target site in the travel route of the garbage truck 30. Thus, the next collection site corresponds to a predetermined collection site that is a yet-to-be-visited collection site by which the garbage truck 30 passes after the analysis target site. For example, the CPU 12 calculates the travel time based on a travel distance of the garbage truck 30 from the analysis target site to the next collection site and an estimated travel speed of the garbage truck 30. In this case, the CPU 12 calculates the travel time such that the travel time becomes shorter as the travel distance becomes shorter. The CPU 12 calculates the travel time such that the travel time becomes shorter as the estimated travel speed becomes higher. For example, the CPU 12 can calculate the travel distance that is the distance from the analysis target site to the next collection site based on the travel route in the map data. The CPU 12 can calculate the estimated travel distance, for example, according to whether there is traffic congestion from the analysis target site to the next collection site. In this case, the CPU 12 can determine whether there is traffic congestion from the analysis target site to the next collection site by acquiring the latest traffic information from a traffic information distribution sensor. When the CPU 12 has calculated the travel time from the analysis target site to the next collection site, the CPU 12 moves to the process of step S9.

In step S9, the CPU 12 determines whether the analysis target site that is the target at the current point in time is a first-time yet-to-be-visited collection site that is the first to have been identified in the current notification process. Hereinafter, this first-time yet-to-be-visited collection site will be referred to as a first collection site. When the analysis target site is not the first collection site (step S9: NO), the CPU 12 skips the subsequent step S10 and moves to the process of step S11. On the other hand, when the analysis target site is the first collection site (step S9: YES), the CPU 12 moves to the process of step S10.

In step S10, the CPU 12 calculates an expected time of arrival at the first collection site. First, the CPU 12 calculates a travel time from the current position of the garbage truck 30 to the first collection site by the same procedure as step S8. When the CPU 12 has calculated the travel time, the CPU 12 sets a time that is advanced from the time of the current point in time by the calculated travel time as the expected time of arrival at the first collection site. When the CPU 12 has calculated the expected time of arrival at the first collection site, the CPU 12 performs the following. The CPU 12 stores a set in which the collection site number of the first collection site and the expected time of arrival at the first collection site are associated with each other as first data of calculation result information in the memory 14. To this calculation result information, expected times of arrival at other yet-to-be-visited collection sites are sequentially added through the process of the subsequent step S11. The collection site number of the first collection site is the target site number at the current point in time. Thereafter, the CPU 12 moves to the process of step S11.

In step S11, the CPU 12 calculates an expected time of arrival at the next collection site. First, the CPU 12 retrieves the expected time of arrival for the yet-to-be-visited collection site immediately preceding the next collection site, i.e., for the target site number at the current point in time from among the pieces of calculation result information stored in the memory 14. The CPU 12 calculates the expected time of arrival at the next collection site based on this expected time of arrival and the travel time to the next collection site calculated in step S8. Specifically, the CPU 12 sets, as the expected time of arrival at the next collection site, a time that is advanced from the aforementioned expected time of arrival by the travel time calculated in step S8. Thereafter, the CPU 12 adds the expected time of arrival at the next collection site to the calculation result information in association with the collection site number of the next collection site. Thereafter, the CPU 12 moves to the process of step S12.

In step S12, the CPU 12 determines whether the analysis has been finished for all the collection sites for which the expected times of arrival should be calculated. Specifically, in step S12, the CPU 12 determines whether the target site number at the current point in time matches the aforementioned analysis end number that has been identified before the notification process has been started. When the target site number at the current point in time does not match the analysis end number (step S12: NO), the CPU 12 returns to step S1. On the other hand, when the target site number at the current point in time matches the analysis end number (step S12: YES), the CPU 12 moves to the process of step S13.

In step S13, the CPU 12 generates a notification image. The notification image is an image for notifying the user of the collection site of the expected time of arrival of the garbage truck 30 at each collection site. The CPU 12 generates the notification image so as to reflect the contents of the calculation result information. As shown in FIG. 3, the notification image is, for example, a list in which pieces of necessary information for the respective collection sites are arranged from top in order of increasing collection site number. The pieces of necessary information include the collection site number, the region name of the collection site, and the expected time of arrival. For the region name of the collection site, the CPU 12 converts the identification value representing the region name of the collection site included in the map data into a character string of the actual region name and writes this character string into the notification image. The CPU 12 handles the expected time of arrival as follows. For a collection site for which the expected time of arrival has been calculated, i.e., for a yet-to-be-visited collection site, among the plurality of collection sites, the CPU 12 writes the expected time of arrival included in the calculation result information into a map image. On the other hand, for a collection site for which the expected time of arrival has not been calculated, the CPU 12 writes to the effect that garbage has already been collected in the notification image. As shown in FIG. 2, when the CPU 12 has generated the notification image, the CPU 12 moves to the process of step S14.

The collection site corresponding to the analysis end number, i.e., the last but one collection site in the travel route will be referred to as an analysis end site. Here, regarding step S13, when the current position of the garbage truck 30 when the notification process is executed is between the analysis end site and the last collection site in the travel route, the CPU 12 reaches step S13 without calculating the expected time of arrival at the last collection site due to relationships with step S2, step S12, etc. Therefore, only when the current position of the garbage truck 30 when the notification process is executed is between the analysis end site and the last collection site, the CPU 12 performs the following process in step S13. The CPU 12 calculates the expected time of arrival at the last collection site taking into account a travel distance from the current position of the garbage truck 30 to the last collection site, etc. Then, the CPU 12 generates a notification image in which the calculated time is indicated as the expected time of arrival at the last collection site. In this notification image, it is indicated to the effect that garbage at all the other collection sites has already been collected.

In step S14, the CPU 12 enters a standby state of waiting for a transmission request from the user terminal 50. When the CPU 12 acquires a transmission request from the user terminal 50, the CPU 12 outputs the notification image generated in step S13 to the user terminal 50 as notification information. When making a transmission request to the server 10, the user terminal 50 includes the route number of the collection area where the owner of the user terminal 50 lives in the transmission request. Based on this route number, the CPU 12 can determine a notification image for which collection area as a target is requested. In step S14, the CPU 12 outputs the notification image upon a transmission request for the target collection area. After the process of step S14 is started, when a timing for executing the next notification process comes, the CPU 12 ends the process of step S14 after deleting the calculation result information and the notification image from the memory 14. Then, the CPU 12 temporarily ends the notification process.

As described above, the CPU 12 does not execute the notification process during a time window before the garbage truck 30 departs from the base. When there is a request for an arrival time from the user terminal 50 during this time window, the CPU 12 outputs an image indicating to the effect that garbage collection has not yet been started to the user terminal 50. The CPU 12 does not execute the notification process also during a time window after the garbage truck 30 has reached the last collection site. When there is a request for an arrival time from the user terminal 50 during this time window, the CPU 12 outputs an image indicating to the effect that garbage collection has been finished to the user terminal 50.

Workings and Effects of Embodiment (1) When the amount of garbage brought together at a collection site is large, collecting the garbage at that collection site takes time. Accordingly, in this case, the times of arrival at the subsequent yet-to-be-visited collection sites become later. The CPU 12 takes into account such an amount of garbage collected at each collection site when calculating the expected time of arrival at each of the subsequent yet-to-be-visited collection sites. Specifically, when calculating the expected time of arrival at the next collection site, the CPU 12 calculates the expected time of arrival at the next collection site such that the expected time of arrival becomes later when the estimated garbage amount at the analysis target site is large than when the estimated garbage amount at the analysis target site is small. By thus calculating the expected time of arrival taking into account whether the estimated garbage amount is large or small, the CPU 12 can accurately calculate the expected time of arrival at each yet-to-be-visited collection site. Then, the CPU 12 outputs the notification image reflecting such expected times of arrival to the user terminal 50. The CPU 12 can thereby provide the user with more accurate information as the expected time of arrival at each yet-to-be-visited collection site. With such information, the user is less likely to be late for taking out garbage.

(2) The amount of garbage brought together at a collection site increases gradually as time passes. Therefore, when calculating the estimated garbage amount based on an image, using an image that is captured at as late a time as possible reduces the likelihood of deviation of the estimated garbage amount from the actual garbage amount at the point when the garbage truck 30 arrives at the collection site. Therefore, when identifying the analysis target image, if there is a plurality of candidate images for the same yet-to-be-visited collection site as a target, the CPU 12 selects an image of which the imaging date and time is the latest of the candidate images as the analysis target image. Then, the CPU 12 calculates the estimated garbage amount based on this analysis target image. Thus, the CPU 12 calculates the estimated garbage amount at the analysis target site based on the latest information on the analysis target site. By thus calculating the expected time of arrival based on the estimated garbage amount, the CPU 12 can more accurately calculate the expected time of arrival at each yet-to-be-visited collection site.

(3) Garbage brought together at a collection site can be messed up by, for example, a wild animal. In this case, the garbage is in a littered state at the collection site. If the garbage is littered at the collection site, collecting the garbage at that collection site takes time. The CPU 12 calculates the expected time of arrival at each yet-to-be-visited collection site taking into account such a degree of littering of garbage. Specifically, when calculating the expected time of arrival at the next collection site, the CPU 12 calculates the expected time of arrival at the next collection site such that the expected time of arrival becomes later when the level of littering at the analysis target site is high than when the level of littering at the analysis target site is low. By thus calculating the expected time of arrival taking into account the degree of littering of garbage, the CPU 12 can more accurately calculate the expected time of arrival at each yet-to-be-visited collection site.

(4) The CPU 12 calculates the expected time of arrival at each yet-to-be-visited collection site taking into account the volume of traffic from the current position of the garbage truck 30 to that yet-to-be-visited collection site. Specifically, when calculating the expected time of arrival at the next collection site, the CPU 12 calculates the expected time of arrival at the next collection site such that the expected time of arrival becomes later when the volume of traffic from the analysis target site to the next collection site is large than when the volume of traffic from the analysis target site to the next collection site is small. By thus calculating the expected time of arrival taking into account the volume of traffic, the CPU 12 can more accurately calculate the expected time of arrival at each yet-to-be-visited collection site.

(5) For example, at a collection site near an apartment building, the amount of garbage can become larger in early spring than in other periods due to moving for a new life in early spring, etc. The CPU 12 calculates the expected time of arrival at each yet-to-be-visited collection site taking into account such a difference in the amount of garbage according to the period. Specifically, when calculating the expected time of arrival at the next collection site, the CPU 12 calculates the expected time of arrival at the next collection site such that the expected time of arrival becomes later when the imaging date and time of the analysis target image is a date and time within the first period than when the imaging date and time of the analysis target image is a date and time within the second period. By thus calculating the expected time of arrival taking into account the difference in the amount of garbage according to the period, the CPU 12 can more accurately calculate the expected time of arrival at each yet-to-be-visited collection site.

Modified Examples

The above-described embodiment can be modified as follows. The above-described embodiment and the following modified examples can be combined within such a range that no technical inconsistency arises.

The length of the individual period is not limited to the example of the above-described embodiment. The individual period should be long enough to be able to grasp an average transition of the amount of garbage.

The method of reflecting the first period and the second period on the required collection time and, by extension, the expected time of arrival is not limited to the example of the above-described embodiment. The reflection method should at least meet the following condition: The expected time of arrival at the next collection site becomes later when the imaging date and time of the analysis target image is a time and date within the first period than when the imaging date and time of the analysis target image is a time and date within the second period.

It is not essential to reflect the first period and the second period on the expected time of arrival.

It is not essential to use the learned model in calculating the level of littering.

It is not essential to specify the level of littering based on the number of pieces of garbage thrown out of garbage bags. The level of littering may be specified according to an appropriate definition such that the level of littering becomes higher as the degree of littering of garbage becomes higher in terms of the garbage being thrown out of garbage bags and littered.

The method of reflecting the level of littering on the required collection time and, by extension, the expected time of arrival is not limited to the example of the above-described embodiment. The reflection method should at least meet the following condition: The expected time of arrival at the next collection site becomes later when the level of littering at the analysis target site is high than when the level of littering at the analysis target site is low.

It is not essential to reflect the level of littering on the expected time of arrival.

The information showing whether the volume of traffic is large or small is not limited to whether there is traffic congestion. For example, the volume of traffic may be indicated by multiple levels by which the volume of traffic is rated.

The method of reflecting the volume of traffic on the travel time and, by extension, the expected time of arrival is not limited to the example of the above-described embodiment. The reflection method should at least meet the following condition: The expected time of arrival at the next collection site becomes later when the volume of traffic from the analysis target site to the next collection site is large than when the volume of traffic from the analysis target site to the next collection site is small.

It is not essential to reflect the volume of traffic on the expected time of arrival.

It is not essential to use the learned model in calculating the estimated garbage amount.

It is not essential to specify the amount of garbage based on the number of garbage bags. The amount of garbage may be specified by an appropriate definition.

The method of reflecting the estimated garbage amount on the required collection time and, by extension, the expected time of arrival is not limited to the example of the above-described embodiment. The reflection method should at least meet the following condition: The expected time of arrival at the next collection site becomes later when the estimated garbage amount at the analysis target site is large than when the estimated garbage amount at the analysis target site is small.

Regarding the identification of the analysis target image, it is not essential, when there is a plurality of the same candidate images, to select an image of which the imaging date and time is the latest of these candidate images. Even an image of which the imaging date and time is not the latest is effective information in calculating the estimated garbage amount, if the image is an image captured on the day of garbage collection.

The notification information is not limited to the notification image. The notification information may be of any form as long as an expected time of arrival at a yet-to-be-visited collection site can be notified.

The aspect of outputting the notification information to the user terminal 50 is not limited to the example of the above-described embodiment. For example, without waiting for a transmission request from the user terminal 50, the user terminal 50 that is registered beforehand may be automatically notified of the notification information. The notification information may be output to the user terminal 50 using an e-mail etc.

Regarding the data generation process performed by the control device 72 of the vehicle 70, the following aspect may be adopted: When generating the data-to-be-provided, the CPU 74 may analyze an image that the camera 82 has captured when the vehicle 70 has passed by a registered point, and may transmit the image to the server 10 as the data-to-be-provided after confirming that the collection site appears in the image.

What is claimed is:

1. A garbage collection time notification method that is performed by an information processing device configured to communicate with a garbage truck and a vehicle, wherein the garbage truck includes a receiver that acquires information on a current position of the receiver itself;

the information processing device is configured to communicate with the garbage truck, the information processing device storing position information on a plurality of collection sites at which the garbage truck collects garbage, and a travel route along which the garbage truck visits the plurality of collection sites one after another; and the vehicle including a camera that images surroundings and a vehicle receiver that acquires information on a current position of the vehicle receiver itself from a global positioning satellite, wherein the current position of the vehicle receiver includes a latitude and a longitude, the method comprising:

receiving, from the vehicle, images in which the collection sites appear, along with imaging information showing an imaging position including the latitude and the longitude and an imaging date and time of each of the images;

acquiring information on a current position of the garbage truck;

based on the information on the current position of the garbage truck and the imaging information, identifying, among the plurality of images acquired from the vehicle, a yet-to-be-visited collection site image, wherein the yet-to-be visited collection site image shows a yet-to-be-visited collection site that the garbage truck has not yet passed in the travel route;

calculating, by a first machine learning model that has been installed in a server beforehand, an estimated garbage amount for the yet-to-be-visited collection site image that is an estimated value of an amount of garbage brought together at the yet-to-be-visited collection site, wherein the first machine learning model is a learned model that has been learned using first teacher data generated from various yet-to-be-visited collection site images of different amounts of garbage prepared beforehand, wherein parameters of the first machine learning model are repeatedly adjusted such that the output of the first machine learning model is executed using each first teacher data as a target approaches a correct-answer information, before the first machine learning model being installed in the server, and wherein the first machine learning model receives the yet-to-be-visited collection site image from the vehicle as an input and outputs the estimated garbage amount;

calculating an expected time of arrival at a predetermined collection site that is the collection site by which the garbage truck passes after the yet-to-be-visited collection site in the travel route such that the expected time of arrival at the predetermined collection site becomes later when the estimated garbage amount is large than when the estimated garbage amount is small; and outputting, to a user terminal, notification information for notifying the expected time of arrival at the predetermined collection site, wherein the information processing device performs:

calculating, by a second machine learning model that has been installed in a server beforehand, a level of littering of garbage at the yet-to-be-visited collection site based on the yet-to-be-visited collection site image, wherein the second machine learning model is a learned model that has been learned using second teacher data generated from various yet-to-be-visited collection site images of different amounts of garbage prepared beforehand, wherein parameters of the second machine learning model are repeatedly adjusted such that the output of the second machine learning model is executed using each second teacher data as a target approaches a correct-answer information, before the second machine learning model being installed in the server, and wherein the second machine learning model receives the yet-to-be visited collection site image from the vehicle as an input and outputs the level of littering of garbage; and calculating the expected time of arrival at the predetermined collection site such that the expected time of arrival at the predetermined collection site becomes later when the level of littering is high than when the level of littering is low.

2. The garbage collection time notification method according to claim 1, wherein, when there is a plurality of yet-to-be-visited collection site images for the same yet-to-be-visited collection site, the information processing device calculates the estimated garbage amount based on the yet-to-be-visited collection site image of which the imaging date and time is latest of the plurality of yet-to-be-visited collection site images for the same yet-to-be-visited collection site.

3. The garbage collection time notification method according to claim 1, wherein the information processing device performs:

acquiring traffic information on the travel route from the yet-to-be-visited collection site for which the estimated garbage amount has been calculated to the predetermined collection site; and calculating the expected time of arrival at the predetermined collection site such that the expected time of arrival at the predetermined collection site becomes later when a volume of traffic from the yet-to-be-visited collection site for which the estimated garbage amount has been calculated to the predetermined collection site is large than when the volume of traffic is small.

4. The garbage collection time notification method according to claim 1, wherein:

the information processing device stores a period division list that shows, for each of the collection sites, a first period in which an amount of garbage is equal to or larger than a set value specified beforehand and a second period in which an amount of garbage is smaller than the set value; and the information processing device calculates the expected time of arrival at the predetermined collection site such that the expected time of arrival at the predetermined collection site becomes later when the imaging date and time of the yet-to-be-visited collection site image based on which the estimated garbage amount has been calculated is a date and time within the first period corresponding to the yet-to-be-visited collection site for which the estimated garbage amount has been calculated than when the imaging date and time is a date and time within the second period.

5. The garbage collection time notification method according to claim 1, wherein the information processing device is configured to communicate with a garbage truck and a plurality of vehicles, and the method includes receiving the images in which the collection sites appear from the plurality of vehicles.

6. The garbage collection time notification method according to claim 1, wherein the notification information being a map image with the expected time of arrival thereon.

7. A garbage collection time notification system comprising:

a vehicle;

a user terminal;

a garbage truck; and an information processing device, wherein the information processing device is configured to perform the garbage collection time notification according to claim 1, and the user terminal is configured to send a transmission request to the information processing device, the transmission request includes information on the predetermined collection site, and display an image according to the notification information received from the information processing device on a day of a week for garbage collection in the predetermined collection site, the image showing the expected time of arrival of the garbage truck at the predetermined collection site.

\* \* \* \* \*